Figure 1:
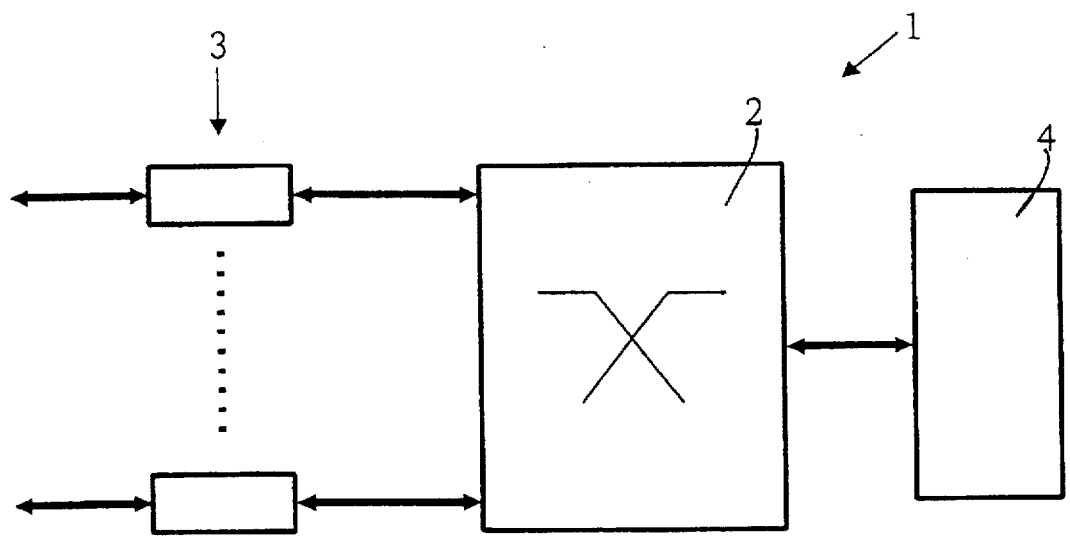

United States Patent [19]
Tjabben et al.

[11] Patent Number: 5,673,261
[45] Date of Patent: Sep. 30, 1997

[54] COMMUNICATION SYSTEM

[75] Inventors: Hermann Tjabben; Stephan Abramowski, both of Aachen, Germany; Armand M. M. Lelkens, Klimmen, Netherlands

[73] Assignee: U.S. Philips Corporation, New York, N.Y.

[21] Appl. No.: 520,449

[22] Filed: Aug. 29, 1995

[30] Foreign Application Priority Data

Aug. 31, 1994 [DE] Germany ............. 44 30 876.0

[51] Int. Cl.⁶ ............. H04Q 1/30; H04M 3/42
[52] U.S. Cl. ............. 370/384; 379/91; 379/201
[58] Field of Search ............. 370/68.1, 58.2, 370/62, 110.1; 379/91, 93, 94, 114, 115, 201, 207, 230, 229

[56] References Cited

U.S. PATENT DOCUMENTS

| | | | |
|---|---|---|---|
| 4,791,640 | 12/1988 | Sand | 370/58.2 |
| 5,499,290 | 3/1996 | Koster | 379/242 |
| 5,526,413 | 6/1996 | Cheston, III et al. | 379/201 |

OTHER PUBLICATIONS

"Hardware und Software des Dienstvermittlungssytems Passt" by J. Friedrichs, H.G. Hopf and M. Krekeler, PKI Tech. Mitt Feb. 1989, pp. 15 to 23.

Primary Examiner—Douglas W. Olms
Assistant Examiner—Matthew C. Phillips
Attorney, Agent, or Firm—Steven R. Biren

[57] ABSTRACT

A communication system including a switching system which comprises a switching unit and a control circuit. The control circuit comprises a transmitting-side signalling handler procedure (ASH) for managing the connection and for exchanging messages with other procedures, and a receiving-side signalling handler procedure (BSH) for managing the connection and for exchanging messages with other procedures. For providing optional external services, the switching unit is coupled to a service control system. Furthermore, the control circuit comprises an additional procedure (ZUSA) for exclusively exchanging messages with the transmitting-side and the receiving-side signalling handler procedures (ASH, BSH). For specific messages, the additional procedure (ZUSA) is provided for exchanging messages by a service program (SERV) of the service control system and, dependent upon the messages produced by the service program (SERV), provided for sending messages to the transmitting-side and/or receiving-side signalling handler procedures (ASH, BSH).

3 Claims, 4 Drawing Sheets

COMMUNICATION SYSTEM

BACKGROUND OF THE INVENTION

1. Field of the Invention

This invention relates to a communication system including a switching system which comprises a switching unit and a control circuit, which control circuit comprises:

- a transmitting-side signalling handler procedure for managing the connection and for exchanging messages with other procedures, and
- a receiving-side signalling handler procedure for managing the connection and for exchanging messages with other procedures.

2. Discussion of the Related Art

Such a communication system is known from the document "Hardware und Software des Dienstvermittlungssystems PAsst" by J. Friedrichs, H. G. Hopf and M. Krekeler, PKI Tech. Mitt. 2/1989, pages 15 to 23. This communication system consists of a switching system comprising a switching unit, a plurality of peripheral groups coupled to the switching unit and a control circuit controlling the switching unit and the peripheral groups. The control circuit is a multi-network processor which performs checking, management and control procedures. The software of the control circuit also performs switching functions between various subscribers or other switching systems.

The known switching system is unable to make use of optional external services. Such a service is, for example, credit card calling, which makes it possible for the subscriber to hold telephone conversations from his/her terminal after dialing a service number and after a successful authorization. The call charges are then booked to the debit of his credit card account. Both authorization and debiting of the call charges are to take place in an external component because the data necessary for performing the services are generally not available in the switching system.

SUMMARY OF THE INVENTION

Therefore, it is an object of the invention to provide a switching system which makes it possible also to connect to optional external services.

In a switching system of the type defined in the opening paragraph the above object is achieved in that the switching unit is coupled to a service control system, in that the control circuit comprises an additional procedure for exclusively exchanging messages with the transmitting-side and the receiving-side signalling handler procedures, and, when certain messages occur, in that the additional procedure is provided for exchanging messages by a service program of the service control system and, in dependence on the messages produced by the service program, for sending messages to the transmitting-side and/or receiving-side signalling handler procedure.

In the communication system according to the invention the switching unit of the switching system is coupled to an external service control system. Such a service control system may be, for example, a service control point of an intelligent network, or a CSTA (Computer-Supported Telecommunication Application) computing function. In such a service control system there are various service programs available. For the switching system to request such a service program, the software responsible for the switching function is extended by an additional procedure. This additional procedure receives all of the messages from the transmitting-side and receiving-side signalling handler procedures, so that an exchange of messages between the transmitting-side and receiving-side signalling handler procedures is only possible via the additional procedure. In response to specific messages, the additional procedure can transmit messages to the service control system to invoke or communicate with a service program. If specific messages occur, the service program sends a response to the additional procedure, from which messages the additional procedure generates messages for the transmitting-side and/or receiving-side signalling handler procedures.

For example, with a call reroute service program, an alternative route (call number) is announced after a 'busy' signal has been received by the receiving-side signalling handler procedure, which procedure has been switched to the service program via the additional procedure. After receiving the message, the additional procedure attempts to establish a new connection and thereto sends appropriate messages to the transmitting-side and/or receiving-side signalling handler procedures.

By implementing the invention, a general procedure is made possible for connecting to optional external services, without essential modifications of existing procedures of the software dedicated to the switching functions. The additional procedure is added to the existing software and needs at least the messages from the transmitting-side and/or receiving-side signalling handler procedures for a communication with the external service control system.

The additional procedure comprises both a transmitting-side and a receiving-side state procedure for detecting the state of the transmitting-side and receiving-side signalling handler procedures on the basis of the received messages. In the two state procedures, the state in the transmitting-side and receiving-side signalling handler procedures is copied in a simpler manner in response to the received messages. As a result, the various messages can be assigned in a simple manner in the state procedures.

Furthermore, the additional procedure comprises an event handler procedure

- for receiving detection points which feature respective messages of a transmitting-side or receiving-side signalling handler procedure, and
- for testing whether an exchange of messages is to be effected by a service program at a specific detection point.

The event handler procedure further included in the additional procedure receives from the state procedures a detection point which features a message. A test is then made in the event handler procedure whether a service program is to be tackled and whether data are to be sent to the service program. Specific data which are received by the service control system that manages the service program are used for information, and other data are used for forming a response to the event handler procedure. The response given by the service program is transformed in the event handler procedure into a message for a state procedure. These messages are then transferred, as required, to at least one signalling handler procedure.

The invention likewise relates to a switching system comprising a switching unit and a control circuit, which control circuit comprises:

- a transmitting-side signalling handler procedure for managing the connection and for exchanging messages with other procedures, and
- a receiving-side signalling handler procedure for managing the connection and for exchanging messages with other procedures.

The invention provides that the switching unit is coupled to an external service control system, that the control circuit comprises an additional procedure for exclusively exchanging messages with the transmitting-side and the receiving-side signalling handler procedures, and that, when specific messages occur, the additional procedure is provided for exchanging messages with a service program of the service control system and, in response to the messages produced by the service program, for sending messages to the transmitting-side and/or receiving-side signalling handler procedures.

These and other aspects of the invention will be apparent from and elucidated with reference to the embodiments described hereinafter.

BREIF DESCRIPTION OF THE DRAWINGS

Figure 2:
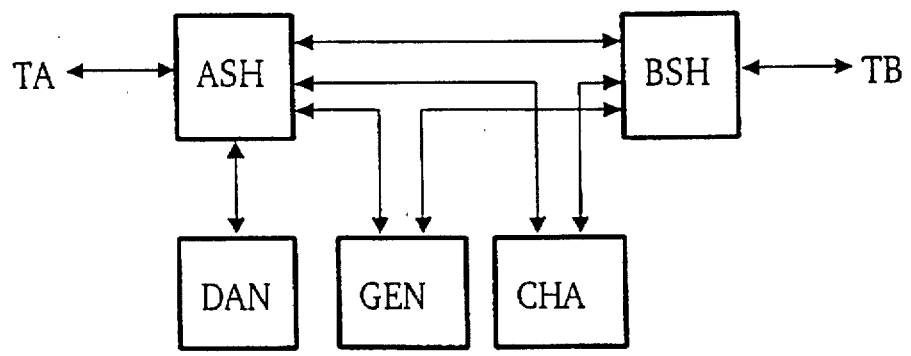
Figure 3:
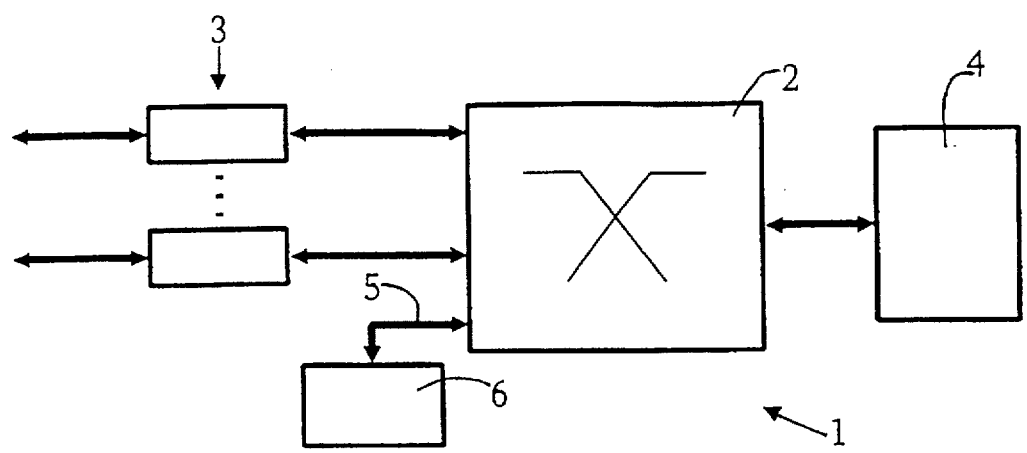
Figure 4:
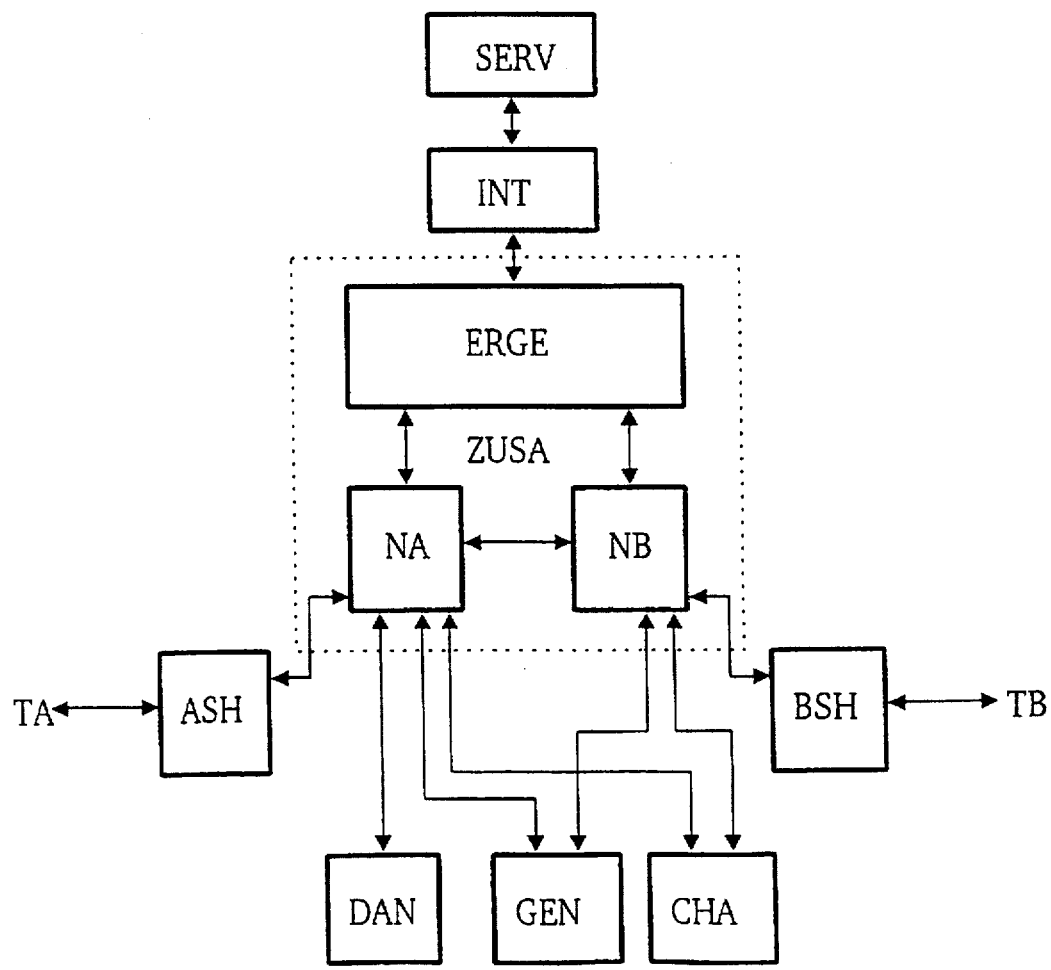
Figure 5:
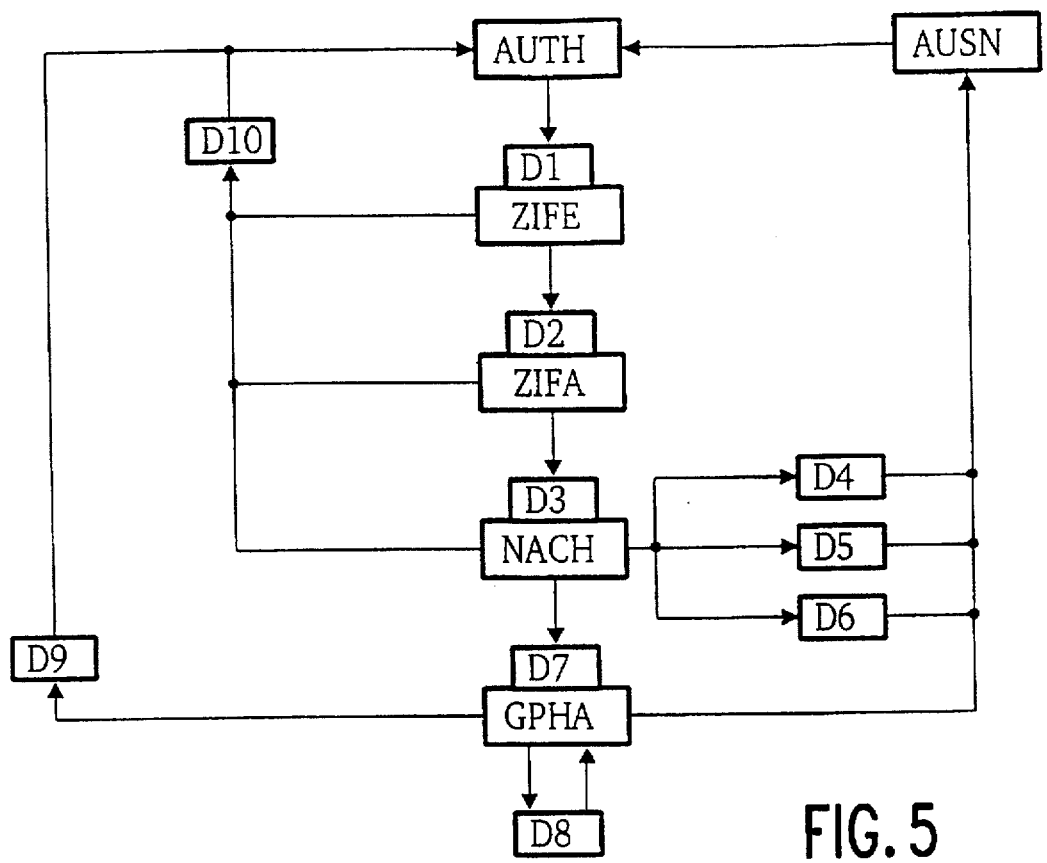
Figure 6:
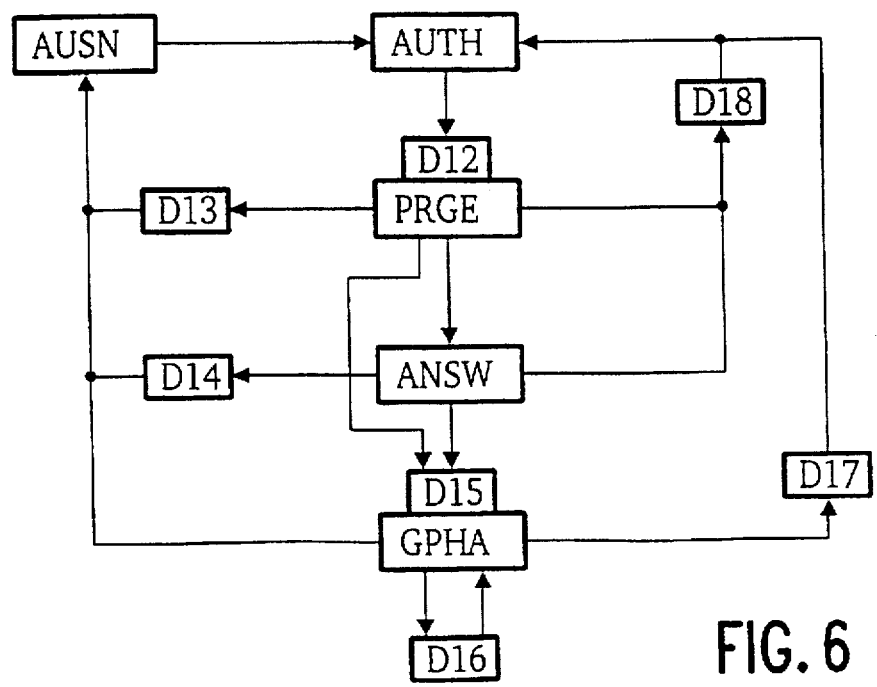
Figure 7:
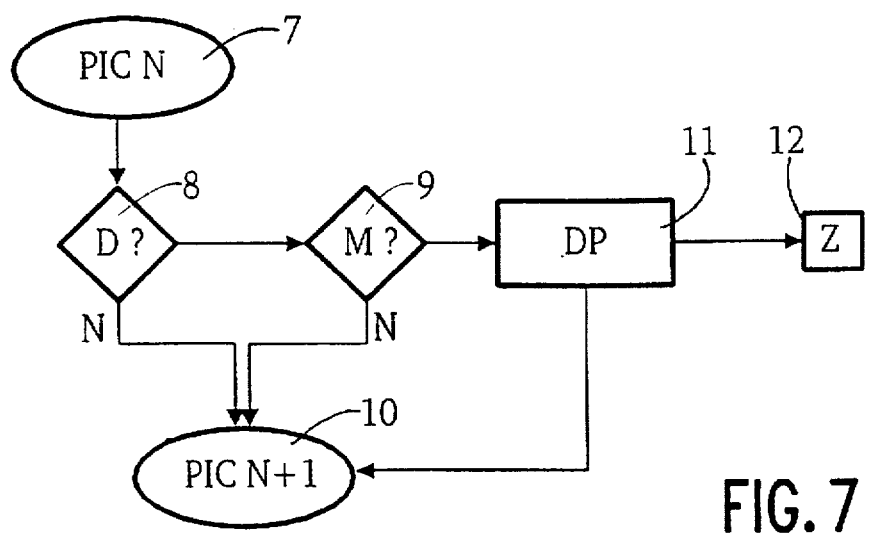
Figure 8:
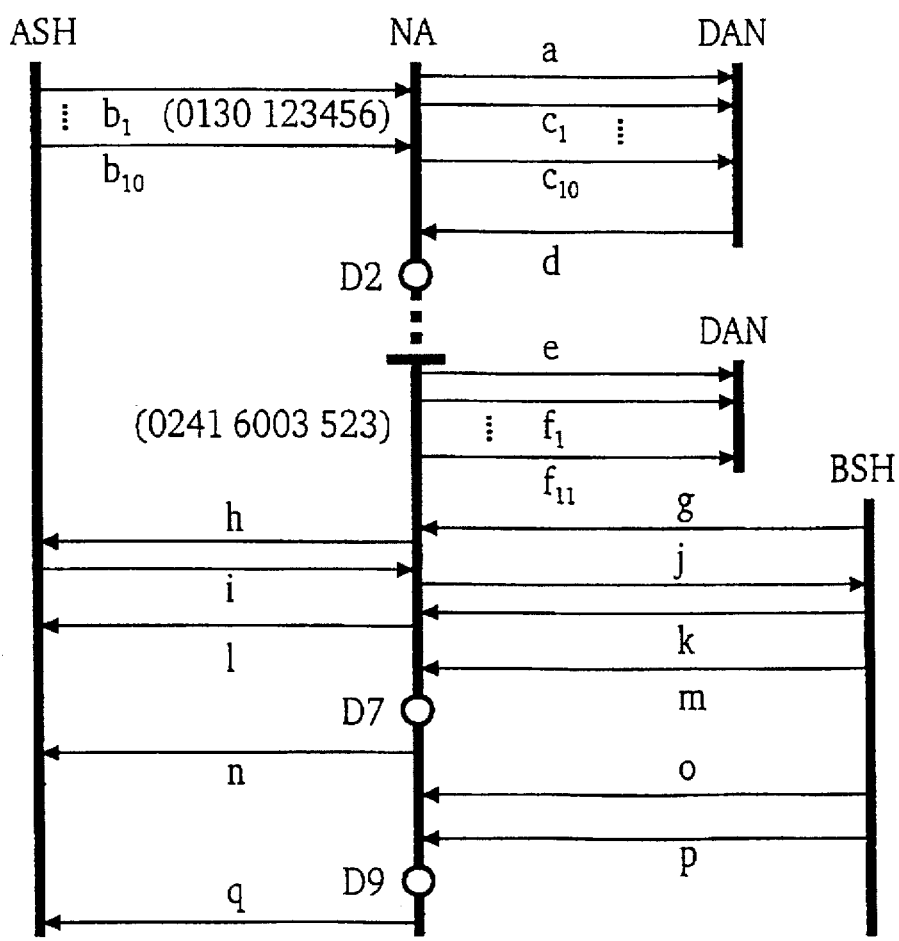

In the drawings:

FIG. 1 shows a block circuit diagram of a known communication system including a switching system, FIG. 2 shows a block circuit diagram of the procedures used for the switching functions of the switching system shown in FIG. 1, FIG. 3 shows a block circuit diagram of the communication system including a switching system and a service control system, FIG. 4 shows a block circuit diagram of the procedures utilized for the switching functions of the switching system shown in FIG. 3, FIG. 5 shows a basic Call state model of the transmitting-side state procedure shown in FIG. 4, FIG. 6 shows a basic call state model of the receiving-side state procedure shown in FIG. 4, FIG. 7 shows a state diagram of the event handler procedure shown in FIG. 4, and FIG. 8 shows a diagram with the various messages used in the additional procedure in a telephone conversation without charge metering.

DETAILED DESRIPTION OF THE PREFERRED EMBODIMENTS

The known switching system 1 shown in FIG. 1 comprises a switching unit 2, a plurality of peripheral groups 3 which are coupled, on the one hand, to various analog and/or digital subscriber lines and/or further switching systems and, on the other hand, to the switching unit 2, and a control circuit 4 which is arranged as a multi-network processor. Such a switching system 1 is known, for example, from the document "Hardware und Software des Dienstvermittlungs-systems PAsst" by J. Friedrichs, H. G. Hopf and M. Krekeler, PKI Techn. Mitt. 2/1989, pages 15 to 23. The control circuit 4 performs checking, management and control procedures in the switching system 1.

Part of the software used by the control circuit 4 is provided for controlling the call management (for example, call set-up and take-down, digit analysis, charge metering). This switching software contains various known procedures which are shown diagrammatically in FIG. 2 by means of a block circuit diagram. An A Signalling Handler procedure ASH manages the transmitting-side (A-side) calls to a subscriber TA. A B Signalling Handler procedure BSH is provided for managing the receiving-side calls to a subscriber TB. It is also possible that there is a further switching system present in lieu of a subscriber TA or TB. A further procedure DAN (Digital Analysis) performs an analysis of the digits entered by the subscriber TA. The procedure CHA (charging) is used for charge metering. An authorization procedure GEN is used for checking whether a subscriber is entitled to a connection. In addition, there may be further procedures available for other monitoring functions.

The procedure ASH, whose function is a transmitting-side or A-side call management, sends various messages to the procedures BSH, GEN, DAN and CHA. An authorization request is sent by the procedure ASH to the procedure GEN. The procedure ASH receives an authorization message from the procedure GEN when a connection desired by a subscriber TA is permitted. Prior to a call, the subscriber TA signals, for example, by lifting the telephone receiver, that he wishes to make a call. On the basis of the authorization message, the dialing tone is switched on, for example.

When the subscriber TA enters digits, an entry message in which an analysis of the digits is made is transferred to the procedure DAN. When the subscriber TB, who is to be called, has been recognized, a selection message is sent via the procedure ASH to the procedure BSH. Furthermore, the procedure ASH detects whether a call message comes from the procedure BSH. When such a call message arrives, the procedure ASH produces a release message. But when the procedure BSH announces that a faulty connection has occurred, or that the B-side is busy, or that the B-side does not respond, the procedure ASH produces respective messages. For example, in the event of a 'busy' B-side, the respective peripheral group 3 produces a 'busy' signal and sends this to the subscriber.

In the event of a fault, the call is terminated via a disconnect message from the procedure ASH. When the subscriber TA terminates the call (puts down the telephone receiver), a disconnect message is produced by the procedure ASH. During a connection the procedure ASH can generate further messages when there are specific call events. In this case an event message is generated by the procedure ASH. For example, a switch-over message is generated when a connection to a further subscriber is to be established for a brief period of time.

The procedure BSH, which is provided for managing the receiving-side or B-side connection to the subscriber TB, also generates messages. The procedure BSH can receive an authorization message in response to an authorization request from the procedure GEN, when a connection is allowed. If it is allowed, for example, the dialing tone is switched on at the subscriber TB. If the B-side is busy, a respective message is generated. If the B-side does not respond, a respective message will be formed after a predetermined period of time. If the subscriber TB responds, the response message is generated by the procedure BSH. In all other cases, a disconnect message is produced. In the case of a connection, event messages accompanying specific connection events (for example, switchover) are produced by the processor BSH. When the call is terminated by the subscriber TB, the procedure BSH, just like the procedure ASH, produces a disconnect message.

To render services not included in the switching system 1 available to the subscribers, the switching system shown in FIG. 1 is extended by further components. In addition to the peripheral groups 3 and the control circuit 4 there is connected to the switching unit 2, via an interface 5, an external service control system 6, as is shown in FIG. 3. The interface 5 may be, for example, of the X.21 type. The service control system 6 may be, for example, a service control point of an intelligent network or a CSTA control point (computer-supported telecommunication application).

For controlling the switching operations by the service control system 6, the procedures known from FIG. 2 have been extended by further procedures. A block circuit diagram of the various procedures is diagrammatically shown in FIG. 4. Messages produced by the signalling handler procedure ASH are applied to a state procedure NA which forms part of an additional procedure ZUSA and monitors the main states of the procedure ASH via the messages from that procedure ASH. Furthermore, the procedure NA transmits all the messages to be sent to the processor ASH. A state procedure NB, which also forms part of the additional procedure ZUSA, monitors the main states of the procedure BSH. Furthermore, the procedure NB is provided for exchanging messages with the procedure BSH. Messages are furthermore transmitted between the two procedures NA and NB.

The procedure DAN for digit analysis exchanges messages with the procedure ASH via the procedure NA. Charge metering messages and authorization requests or authorization messages between the procedures CHA, GEN and ASH and/or BSH respectively, are exchanged via the procedures NA and NB. Further procedures ERGE and INT control the exchange of messages between the switching system and the service control system 6. The procedure ERGE also forms part of the higher-order procedure ZUSA.

For determining the state in the signalling handler procedures ASH and BSH, a Basic Call State Model is used in the state procedures NA and NB. The basic call state model shown in FIG. 5 comprises the essential states or phases in the procedure ASH. Prior to a connection, the procedure ASH sends out an authorization request to the procedure GEN. The state AUTH shown in FIG. 5 indicates the waiting for the authorization message by the procedure GEN. If such a connection is permitted, the procedure ASH receives the authorization message. Based upon the authorization message the dialing tone is switched on, for example. In the basic call state model of FIG. 5, detection points are reached when messages are sent to the procedure ASH or are received by the procedure ASH. The authorization message is characterized by the detection point D1. In the next state ZIFE, the digit entry is transferred by the subscriber TA as an entry message (detection point D2) to the procedure DAN in which a digit analysis is performed. This state is referenced ZIFA. If the subscriber TB, who is to be called, is recognized, a selection message (detection point D3) is sent to the procedure BSH. During the state NACH, the procedure ASH detects whether a connection message comes from the procedure BSH. When such a connection message arrives, a release message (detection point D7) is generated by the procedure ASH, and the state NACH changes into the state GPHA. The state GPHA denotes the connection phase.

However, if the procedure BSH announces that a connection fault has occurred, or that the B-side is busy or that the B-side does not respond, appropriate messages (detection points D4, D5 and D6) are formed by the processor ASH and the exception state AUSN is changed to. For example, in the case of a 'busy' message from the B-side, a 'busy' sign is generated in the respective peripheral group 3 and sent to the subscriber. When the subscriber TA has put down the telephone receiver, (detection point D9), a new call can be initiated in the state AUTH.

If a fault occurs during the state ZIFE, ZIFA or NACH, the call is terminated via a disconnect message (detection point D10) from the procedure ASH. When the subscriber TA or the subscriber TB terminates the call in the state GPHA (puts down the receiver), a disconnect message (detection point D9) is generated by the procedure ASH. During a call phase in the state GPHA, further messages can be generated by the procedure ASH when specific call events occur. In this case an event message (detection point D8) is produced by the processor ASH. For example, a change-over message is generated when a connection to a further subscriber is to be established for a brief period of time.

In FIG. 6 is shown the basic call state model that contains the main states in the procedure BSH. Prior to a connection, the procedure BSH awaits in the state or phase AUTH an authorization message (detection point D12) coming from the procedure GEN. The procedure GEN checks, in response to an authorization request, for example, on the basis of stored data, whether a connection is permitted. After an authorization message has been received, for example, the dialing tone is switched on at the subscriber TB. In the state PRGE there is checked whether the B-side (receiving side) is busy and whether a subscriber can be dialed. If the B-side is busy, a respective message (detection point D13) is generated. If the B-side does not respond, an answering state ANSW is changed to, and after a predefined period of time a respective message (detection point D14) is formed. If the subscriber TB responds, a response message (detection point D15) is produced by the procedure BSH. In all other cases a disconnect message (detection point D18) is generated. After the response message, the slate GPHA denoting the connection phase is proceeded to. The connection phase may be briefly abandoned when there are specific events. In this case, an event message (detection point D16) is produced by the procedure RSH. If a fault occurs during a connection phase, the exception state AUSN is changed to. When the call is terminated by the subscriber TB, the procedure BSH produces a disconnect message (detection point D17), as did procedure ASH.

If different messages are produced in the procedures ASH and BSH respectively, a different basis call state model can used as a basis. The basic call state model described above can be extended, as required, for further messages by further detection points.

When a detection point is reached, the procedures NA and NB, announce the same to the event handler procedure ERGE which handles the event. The procedure ERGE then also distinguishes the origin of the messages. This means that messages from the procedures NA and NB are processed as separate events.

The processing of events in the procedure ERGE for messages from the procedure NA is shown diagrammatically in FIG. 1. The state PIC N (block 7; Point In Call) represents a state or the procedure NA. A message from the procedure NA is supplied to the procedure ERGE as a respective detection point. For the further processing, the procedure ERGE accesses a Table for an interpretation of the meaning of the detection points for the respective subscribers.

First the procedure ERGE (block 8: D?) verifies whether a specific service is to be called. For example, it should be possible to call a service only at specific instants. If the service is necessary, there should be tested whether the respective subscriber has already called another service. If this is not the case, there is queried (block 9: M?) whether a response from a service program is necessary. If this is not necessary, the procedure NA changes to the next PIC N+1 (block 10) as is the case with a negative previous test. Only the message is then supplied to the service program. If a response from a service program is necessary. The procedure DP (block 11) is invoked, which carries out a specific operation. Thereto, a service program may be started, or messages exchanged by the service program.

Subsequently, the procedure DP indicates to what state the procedure NA is to proceed. For example, the processing may be continued at the next state (block 10: PIC N+1), or, for example, at the state AUTH (compare FIG. 5). The jump to another state then featured in FIG. 7 by block 12 (Z). After a change of state, the procedure NA generates at least a message for the procedure ASH and, as required, also a message for the procedure BSH. There is an analogous processing of the events for the B-sided events and messages, respectively.

The procedures NA and NB each also produce messages which are necessary for further processing for the procedures BSH and ASH. Such messages are responses to specific messages produced by the procedures ASH and BSH, respectively. For example, the procedure NB transfers the message that the B-side is busy from the procedure BSH to the procedure NA.

The procedure INT further shown in FIG. 4 translates messages to be exchanged by the service control system into the format necessary for the service control system. For example, a service control point of an intelligent network (IN) needs to receive other types of messages than a CSTA control point (computer-supported telecommunication application). A service program which is invoked, for example, by subscriber TA, is represented by the procedure SERV in FIG. 4. Such a service program supplies specific data to the switching system, which data are processed by the procedure DP (block 10 in FIG. 7).

In the following, in the diagram represented in FIG. 8, the message runs in the procedures will be further explained with reference to an example for a service. FIG. 8 relates to a service in which the call charges are not to be debited to the caller, but to the receiver (freephone service). After a subscriber TA has lifted the receiver, and after a successful authorization, this is informed to the procedure DAN via a message A by the procedure NA. The procedure NA has received an authorization message from the procedure GEN. The dialing tone is then switched on. The subscriber TA dials the service number "0130 123456" (messages $b_1$ to $b_{10}$ and $c_1$ to $c_{10}$) which the procedure ASH supplies to the procedure DAN via the procedure NA for a digit analysis. The procedure DAN detects that no connection can be set up to a subscriber TB under the dialled call number (message d). In this case the detection point D2 is reached (compare FIG. 5). The procedure ERGE establishes that a service program is to be invoked. The procedure ERGE receives from the service program the messages that the subscriber TA wishes to set up a connection to the subscriber TB who has the call number "0241 60003 523" and that the subscriber TB is to be charged for the costs. Via the message e from the procedure NA to the procedure DAN there is then stated that further digits are to follow. Procedure NA then supplies the call number to the procedure DAN via the messages $f_1$ to $f_{11}$.

After the call number has been received, the procedure DAN selects a subscriber TB who is managed by the procedure BSH. Via the messages g and h from the procedure BSH, the procedure ASH is informed that a receiver has been selected. Subsequently, there is an acknowledgement of the procedure ASH via the messages i and j. The procedure BSH provides via the messages k and l that the idle tone is switched on at subscriber TA. If the subscriber TB (receiver lifted) responds, a release message m is sent to the procedure NA, which message is featured by the detection point D7. The procedure ERGE supplies to the service program the information that the subscriber TB has responded. This is also announced to the procedure ASH via the message n. The message o is used for reversing the charges to the subscriber TB and is suppressed by the procedure NA. The service program takes over the charges. In this example the subscriber TB disconnects (puts down the receiver). In this case the procedure BSH forms a disconnect message p and sends same to the procedure NA. The procedure ERGE establishes that the detection point D9 has been reached and announces this to the service program. The disconnect message is supplied to the procedure ASH as message q.

In this example the procedures NB and CHA have no function in providing the service. The procedure NB only transfers the messages produced by the procedure BSH.

We claim:

1. Communication system including a switching system which comprises a switching unit and a control circuit, wherein said control circuit comprises:
   a transmitting-side signalling handler procedure (ASH) means for managing a connection and for exchanging messages with other procedures, and
   a receiving-side signalling handler procedure (BSH) means for managing a connection and for exchanging messages with other procedures, wherein said switching unit is coupled to a service control system, said control circuit further comprises an additional procedure (ZUSA) means for exclusively exchanging messages with the transmitting-side and the receiving-side signalling handler procedure means (ASH, BSH), and, when certain messages occur, the additional procedure (ZUSA) means receives and sends messages by a service program (SERV) of the service control system and, in dependence on the messages produced by the service program (SERV), sends messages to the transmitting-side and/or receiving-side signalling handler procedure means (ASH, BSH), and wherein the additional procedure (ZUSA) means comprises both a transmitting-side and a receiving-side state procedure (NA, NB) means for detecting a state of the transmitting-side and receiving-side signalling handler procedure means (ASH, BSH) on the basis of the messages which the additional procedure (ZUSA) means receives.

2. The communication system as claimed in claim 1, wherein the additional procedure (ZUSA) means further comprises an event handler procedure (ERGE) means
   for receiving detection points which feature respective messages of a transmitting-side or receiving-side signalling handler procedure means ASH, BSH), and
   for testing whether an exchange of messages is to be effected by a service program (SERV) at a specific detection point.

3. Switching system which comprises a switching unit and a control circuit, wherein said control circuit comprises:
   a transmitting-side signalling handler procedure (ASH) means for managing a connection and for exchanging messages with other procedures, and
   a receiving-side signalling handler procedure (BSH) means for managing a connection and for exchanging messages with other procedures, wherein said switching unit is coupled to a service control system, said control circuit further comprises an additional procedure (ZUSA) means for exclusively exchanging messages with the transmitting-side and the receiving-side signalling handler procedure means (ASH, BSH), and, when certain messages occur, the additional procedure (ZUSA) means receives and sends messages by a service program (SERV) of the service control system and, in dependence on the messages produced by the service program (SERV), sends messages to the transmitting-side and/or receiving-side signalling handler procedure means (ASH, BSH), and wherein the additional procedure (ZUSA) means comprises both a transmitting-side and a receiving-side state procedure (NA, NB) means for detecting a state of the transmitting-side and receiving-side signalling handler procedure means (ASH, BSH) on the basis of the messages which the additional procedure (ZUSA) means receives.

* * * * *